(12) United States Patent
Kenji (10) Patent No.: US 9,989,733 B2
(45) Date of Patent: Jun. 5, 2018

(54) CAMERA LENS

(71) Applicant: Oinuma Kenji, Shenzhen (CN)

(72) Inventor: Oinuma Kenji, Shenzhen (CN)

(73) Assignee: AAC ACOUSTIC TECHNOLOGIES (SHENZHEN) CO., LTD, Shenzhen (CN)

( * ) Notice: Subject to any disclaimer, the term of this patent is extended or adjusted under 35 U.S.C. 154(b) by 38 days.

(21) Appl. No.: 15/416,785

(22) Filed: Jan. 26, 2017

(65) Prior Publication Data
US 2018/0129019 A1    May 10, 2018

(30) Foreign Application Priority Data
Nov. 4, 2016   (JP) .................................. 2016-216598

(51) Int. Cl.
| | | |
|---|---|---|
| G02B 13/18 | (2006.01) |
| G02B 9/00 | (2006.01) |
| G02B 13/00 | (2006.01) |
| G02B 9/02 | (2006.01) |
| G02B 5/00 | (2006.01) |

(52) U.S. Cl.
CPC ........... *G02B 13/0025* (2013.01); *G02B 9/02* (2013.01); *G02B 5/005* (2013.01); *G02B 9/00* (2013.01); *G02B 13/001* (2013.01); *G02B 13/002* (2013.01); *G02B 13/18* (2013.01)

(58) Field of Classification Search
CPC ...... G02B 13/18; G02B 5/005; G02B 13/002; G02B 13/001; G02B 9/00; G02B 13/0025; G02B 9/02
USPC ................................ 359/718, 719, 738, 739
See application file for complete search history.

(56) References Cited

U.S. PATENT DOCUMENTS

| | | | | |
|---|---|---|---|---|
| 5,677,798 A | * | 10/1997 | Hirano et al. ......... | G02B 13/18 359/717 |
| 6,671,105 B2 | * | 12/2003 | Saito ...................... | G02B 13/18 359/719 |
| 2009/0153983 A1 | * | 6/2009 | Nakanishi et al. .... | G02B 13/18 359/718 |
| 2009/0207508 A1 | * | 8/2009 | Shinohara .............. | G02B 13/18 359/779 |
| 2012/0224268 A1 | * | 9/2012 | Takato ................... | G02B 13/18 359/648 |
| 2014/0104707 A1 | * | 4/2014 | Nakamura et al. .... | G02B 13/18 359/738 |

* cited by examiner

*Primary Examiner* — Evelyn A Lester
(74) *Attorney, Agent, or Firm* — Na Xu; IPro, PLLC (57) ABSTRACT

A camera lens includes an open aperture; and a falcate first lens having a positive refractive power with a convex surface toward an imaging surface side. The camera lens satisfies specific conditions.

4 Claims, 7 Drawing Sheets

CAMERA LENS

FIELD OF THE PRESENT DISCLOSURE

The present disclosure relates to the technical field of camera lens.

DESCRIPTION OF RELATED ART

The present invention relates to a camera lens composed of one piece, with excellent optical properties, small sized, with a total angle of view (hereinafter referred to as 2ω) and a wide angle over 90°, composed of one lens with a high-luminous flux (hereinafter referred to as Fno) F less than 2.40, and applied for biological feature certification such as vein certification or eye tracking identification within the wavelength range of 750 nm~900 nm.

The traditionally used wide angled, small sized camera lens with high-luminous flux Fno is composed of the two pieces disclosed by prior Japanese Patent Publication No. 2006-337402. The lens is composed of providing a first lens with a negative refractive power, a second lens with a positive refractive power, with a view angle of 2ω=90~110° wide angle, and relatively small distortion aberration. It's absolutely enough to be used as identification lens, but not economic in cost with 2 lens used.

Although the camera lens disclosed by the prior Japanese Patent Publication No. 2006-079059 is of low cost by using plastic lens and being composed of one piece, as an identification camera, it's imperfect to has narrow camera range as being narrow angled with a view angle of 40°~50

The camera lens disclosed by the prior Japanese Patent Publication No. 2011-081253 is a camera lens composed of the above-mentioned 1 lens, but it's dark at a value of F in the range of 2.8~3.2, so it's imperfect as an identification lens.

Therefore, an improved camera lens which can overcome the disadvantages mentioned above is desired.

BRIEF DESCRIPTION OF THE DRAWING

Many aspects of the exemplary embodiments can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figure and the embodiments. It should be understood the specific embodiments described hereby are only to explain the disclosure, not intended to limit the disclosure.

Figure 1:
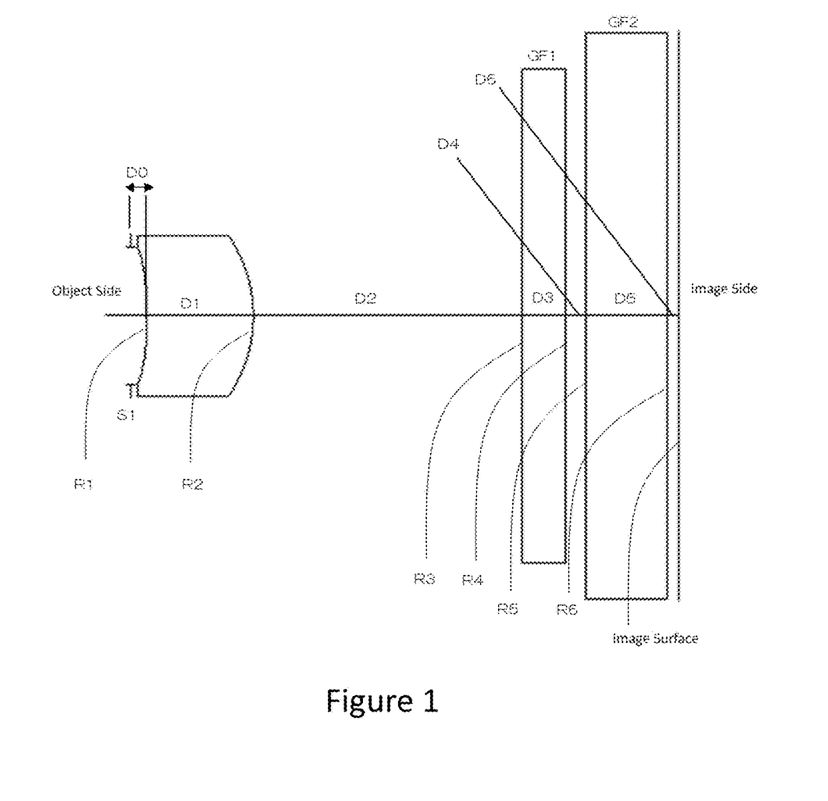
FIG. 1 is a structure diagram of a camera lens LA related to one embodiment of the invention.

FIG. 1 is the structure diagram of a camera lens LA related to one embodiment of the invention. The camera lens is composed of 1 lens group, with an open aperture, a falcate first lens L1 having a positive refractive power with a convex surface toward an imaging surface side provided in order from the object side to the imaging surface side. A glass plate GF is arranged between the first lens L1 and the imaging surface side. It is better not to set the glass plate GF1 and GF2 between the first lens and imaging surface side.

The first lens L1 has positive refractive power. Moreover, the surface of this one lens should be designed as the aspheric shape preferably in order to correct the aberration well. Particularly by using the aspheric shape, the spherical aberration and the coma aberration can be corrected properly.

A camera lens composed of one lens is characterized in that the camera lens meets following conditions (1)~(4):

$$1.70 \leq (R1+R2)/(R1-R2) \leq 1.90 \quad (1)$$

$$0.30 \leq D1/f \leq 0.45 \quad (2)$$

$$0.90 \leq Y/f \leq 1.00 \quad (3)$$

$$1.50 \leq (Y/f) \times 2\omega \leq 1.70 \quad (4)$$

where,

R1: curvature radius of the lens' object side surface

R2: curvature radius of the lens' image side surface d1: center thickness of the first lens L1
f: overall focal distance of the camera lens
Y: Max image height
2ω: total angle of view.

The shape of the first lens L1 is specified in the condition (1). When the upper limit value of the condition is exceeded, the refractive power of all lenses is increased, thus not allowing proper aberration correction of the image surface curvature, coma aberration and distortion aberration, so it's not good. Conversely, when the lower limit value of the condition is exceeded, the refractive power of all the lens is decreased, thus not allowing secured view angle and proper correction of the image surface curvature, coma aberration and distortion aberration, so it's not good.

Therefore, numerical range of condition (1) should be set within the numerical range of the following condition (1-A) preferably, $$1.72 \leq (R1+R2)/(R1-R2) \leq 1.85 \quad \text{(1-A)}$$

The condition (2) aims to secure the limit of back focal point while seeking miniaturization. Therefore, numerical range of condition (2) should be set within the numerical range of the following condition (2-A) preferably, $$0.32 \leq D1/f \leq 0.42 \quad \text{(2-A)}$$

The condition (3) is specified to secure a view angle over 90°. For example, in case of 0.90>Y/f outside the scope of the condition (3), it's difficult to develop toward miniaturization and wide angle. Besides, in case of Y/f>1.00 outside the scope of the condition (3), it's beneficial for wide angle, but it turns more difficult for correction of distortion aberration, while it turns difficult for correction of all aberrations, so it's disadvantageous.

Therefore, numerical range of condition (3) should be set within the numerical range of the following condition (3-A) preferably, $$0.92 \leq Y/f \leq 0.97 \quad \text{(3-A)}$$

The condition (4) is specified to secure a view angle over 90°, just as same as the condition (3). Therefore, numerical range of condition (4) should be set within the numerical range of the following condition (4-A) preferably, furthermore, by establish the condition (3) and (4) simultaneously, all aberrations can be corrected while wide angle can be ensured.

$$1.50 \leq (Y/f) \times 2\omega \leq 1.60 \quad \text{(4-A)}$$

A camera lens composed of one lens is characterized in that the camera lens meets following condition (5):

$$0.50 \leq f/TL \leq 0.60 \quad \text{(5)}$$

where,
f: overall focal distance of the camera lens
TL: axial distance from object side surface to the imaging surface side of the first lens L1

The condition (5) specifies the ratio between the focal distance f of the entire lens group and the axial distance from the image side to the camera lens of the first lens L1. In case of that outside the scope of the condition (5), it's difficult to develop toward miniaturization and wide angle.

Therefore, numerical range of condition (5) should be set within the numerical range of the following condition (5-A) preferably, $$0.50 \leq f/TL \leq 0.575 \quad \text{(5-A)}$$

A camera lens composed of one lens is characterized in that the first lens has positive refractive power and the camera lens meets following conditions (6), (7):

$$1.35 \leq BF/f \leq 1.45 \quad \text{(6)}$$

$$1.53 \leq nd1 \leq 1.60 \quad \text{(7)}$$

where,
f: overall focal distance of the camera lens
BF: axial distance from image side surface to the imaging surface side of the lens
nd1: refractive power the first lens L1's line d The condition (6) specifies the ratio between the back focal point BF and the focal distance f of the entire lens group. In case of that outside the condition (6), it's difficult to ensure the space provided for protective glass for protection of camera surface.

Therefore, numerical range of condition (6) shall be set within the numerical range of the following condition (6-A) preferably, $$1.38 \leq BF/f \leq 1.45 \quad \text{(6-A)}$$

The refractive power of the first lens L1 is specified in the condition (7). When it's below the lower limit value of the condition, the refractive power of all the lens will be decreased and the optical length is increased, so it's disadvantageous. On another side, when it's over the upper limit value of the condition, it turns to be difficult for correction of the distortion aberration, so it's disadvantageous.

As the one lens composing the camera lens LA has the aforementioned constitution and meets all the condition, so it becomes possible to manufacture a camera lens with excellent optical properties, small sized, with a wide angle of 2ω≤90° and applied for biological feature certification such as vein certification or eye tracking identification within the wavelength range of 750 nm~900 nm.

EMBODIMENTS

The camera lens LA of the invention shall be explained below by using the embodiments. Moreover, the symbols used in all embodiments are shown as follows. And mm shall be taken as the unit of the distance, the radius and the center thickness.
f: overall focal distance of the camera lens
Fno: F Value
2ω: total angle of view
S1: Open aperture
R: curvature radius of optical surface, if a lens is involved it is central curvature radius
R1: curvature radius of the first lens L1's object side surface
R2: curvature radius of the first lens L1's image side surface
R3: curvature radius of the glass plate GF1's object side surface
R4: curvature radius of the glass plate GF1's image side surface R5: curvature radius of the glass plate GF2's object side surface
R6: curvature radius of the glass plate GF2's image side surface
d: center thickness of lenses or the distance between lenses
d0: axial distance from open aperture S1 to object side surface of the first lens L1
d1: center thickness of the first lens L1
d2: axial distance from image side surface of the first lens L1 to object side surface of the glass plate GF2
d3: center thickness of glass plate GF1
d4: axial distance from glass plate GF1 to glass plate GF2
d5: center thickness of glass plate GF2
d6: axial distance from image side surface to imaging surface side of the glass plate GF2
nd: refractive power of line d
n1: refractive power the first lens L1's line d
n2: refractive power the glass plate GF1's line d
n4: refractive power the glass plate GF2's line d
vd: abbe number
v1: abbe number of the first lens L1
v2: abbe number of the glass plate GF1
v4: abbe number of the glass plate GF2
TL: optical length (axial distance from object side surface to the imaging surface side of the first lens L1)
BF: axial distance (including thickness of the glass plate GF) from the image side surface to the imaging surface side of the fist lens L1;
Y: Max image height $$y=(x2/R)/[1+\{1-(k+1)(x2/R2)\}1/2]+A4 \times 4+A6 \times 6+A8 \times 8+A10 \times 10+A12 \times 12+A14 \times 14+A16 \times 16 \quad (7)$$

where, R is axial curvature radius, k is cone coefficient, A4, A6, A8, A10, A12, A14, A16 are aspheric coefficients.

For convenience sake, the aspheric surface shown in the formula (8) shall be taken as the aspheric surfaces of all lens' surfaces. However, the invention shall not be limited to polynomial form of the aspheric surface shown in the formula (8).

Embodiment 1

Figure 2:
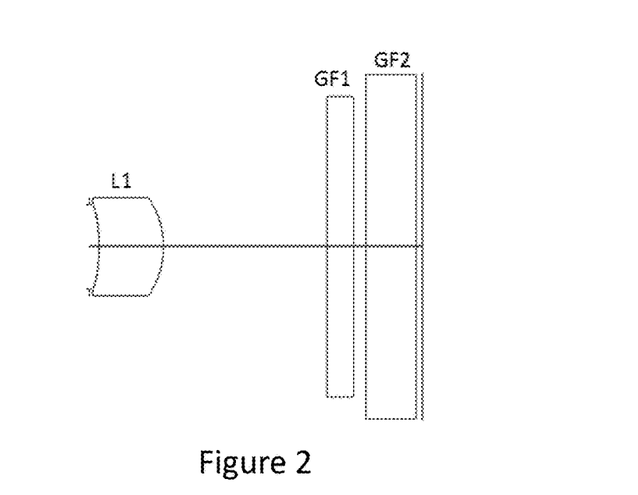
FIG. 2 is a structure diagram of the definite Embodiment 1 of the above-mentioned camera lens LA.

The configuration structure diagram of the camera lens LA in the Embodiment 1 is shown in the FIG. 2. Data shown in Table 1: curvature radius R of the object side surface and the image side surface, center thickness of the lens, distance d among the lenses, refractive power nd and abbe number v of the first lens L1 in the Embodiment 1, wherein the camera lens LA is formed by the first lens L1; Data shown in Table 2: and the data including conical coefficients k and aspheric coefficients

TABLE 1

|    | R      | D   |       | nd  |        | v d |       |
|----|--------|-----|-------|-----|--------|-----|-------|
| S1 | ∞      | D0= | 0.080 |     |        |     |       |
| R1 | -2.324 | D1= | 0.515 | nd1 | 1.5831 | v 1 | 59.39 |
| R2 | -0.675 | D2= | 1.304 |     |        |     |       |
| R3 | ∞      | D3= | 0.210 | nd2 | 1.5168 | v 2 | 64.20 |
| R4 | ∞      | D4= | 0.100 |     |        |     |       |
| R5 | ∞      | D5= | 0.400 | nd3 | 1.5168 | v 3 | 64.20 |
| R6 | ∞      | D6= | 0.050 |     |        |     |       |

TABLE 2

| | Cone coefficiente | Aspheric coefficient | | | | | | |
|---|---|---|---|---|---|---|---|---|
| | k | A4 | A6 | A8 | A10 | A12 | A14 | A16 |
| R1 | 3.9244E+01 | -9.1641E+00 | 4.3545E+02 | -1.0488E+04 | 1.3669E+05 | -9.9851E+05 | 3.8633E+06 | -6.0183E+06 |
| R2 | 5.9133E-01 | 4.1883E+00 | -1.8583E+02 | 4.3286E+03 | -5.4638E+04 | 3.7773E+05 | -1.3354E+06 | 1.8814E+06 |

The values in the embodiments 1, 2 and 3 the values corresponding to the parameters specified in the conditions (1)-(6) are shown in the subsequent Table 7. The designed wavelength of the embodiments 1, 2, 3 is 850 nm.

The Embodiment 1 meets the conditions (1)-(6), as shown in Table 7.

Figure 3:
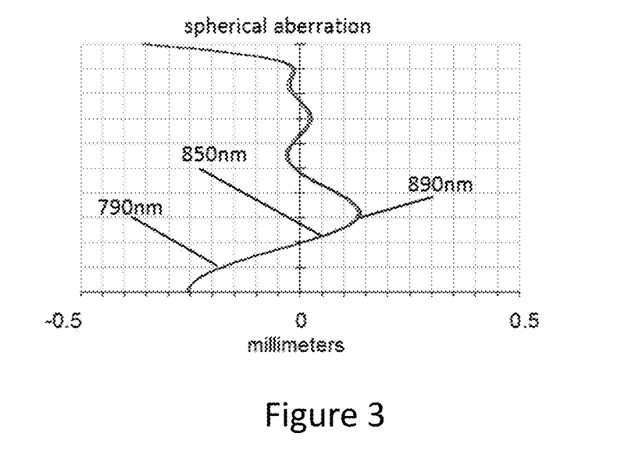
FIG. 3 is the spherical aberration diagram of the camera lens LA in Embodiment 1.
Figure 4:
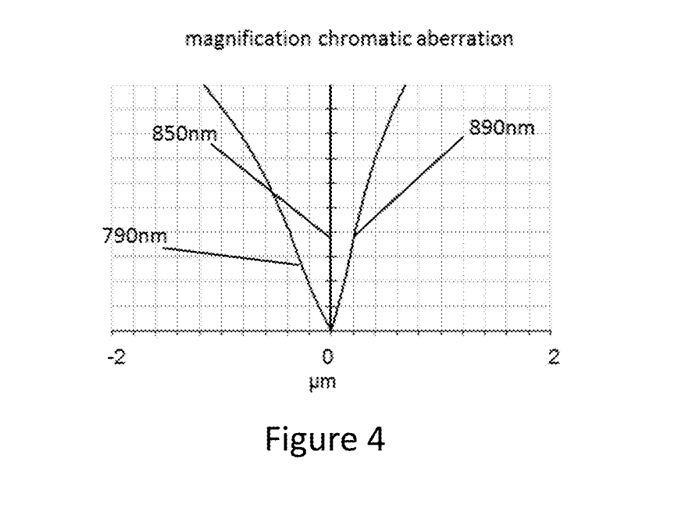
FIG. 4 is the magnification chromatic aberration diagram of the camera lens LA in Embodiment 1.
Figure 5:
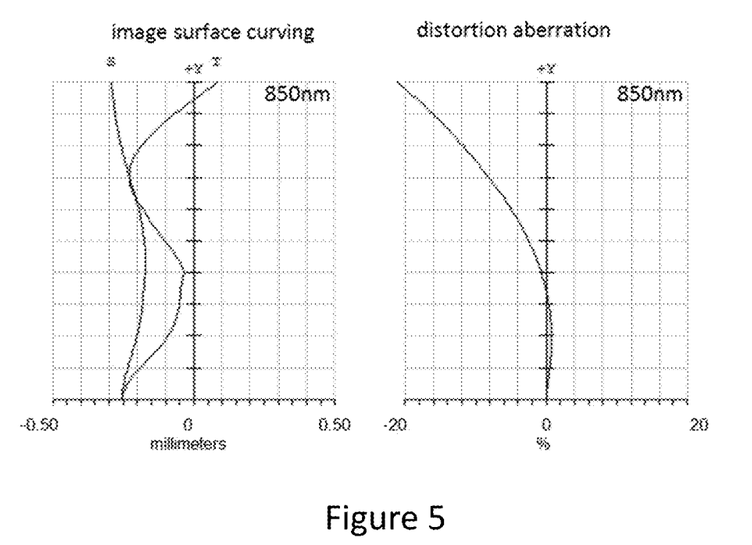
FIG. 5 is the image surface curving diagram and distortion aberration diagram of the camera lens LA in Embodiment 1.

Spherical aberration of camera lens LA in embodiment 1 is shown in FIG. 3, magnification chromatic aberration of the same is shown in FIG. 4, image surface curving and distortion aberration of the same is shown in FIG. 5. Furthermore, image surface curving S in FIG. 4 is the one opposite to the sagittal image surface, T is the one opposite to the tangent image surface. It is also same in the Embodiment 2. The camera lens LA in embodiment 1 has properties as Fno=2.20, 2ω=94.0°, TL=2. 659 mm, so camera lens is small sized and wide angle camera lens, it is not difficult to understand why it has excellent optical properties.

Embodiment 2

Figure 6:
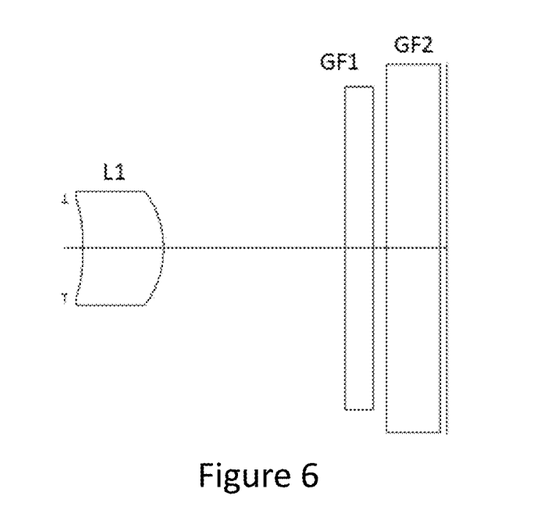
FIG. 6 is the structure diagram of the definite Embodiment 2 of the above-mentioned camera lens LA.

The configuration structure diagram of the camera lens LA in the Embodiment 2 is shown in the FIG. 6. Data shown in Table 3: curvature radius R of the object side surface and the image side surface, center thickness of the lens, distance d among the lenses, refractive power nd and abbe number v of the first lens L1 in the Embodiment 2, wherein the camera lens LA is formed by the first lens L1; Data shown in Table 4: and the data including conical coefficients k and aspheric coefficients

TABLE 3

|    | R      | D   |       | nd  |        | v d |       |
|----|--------|-----|-------|-----|--------|-----|-------|
| S1 | ∞      | D0= | 0.137 |     |        |     |       |
| R1 | -2.507 | D1= | 0.600 | nd1 | 1.5831 | v 1 | 56.12 |
| R2 | -0.693 | D2= | 1.350 |     |        |     |       |
| R3 | ∞      | D3= | 0.210 | nd2 | 1.5168 | v 2 | 64.20 |
| R4 | ∞      | D4= | 0.100 |     |        |     |       |
| R5 | ∞      | D5= | 0.400 | nd3 | 1.5168 | v 3 | 64.20 |
| R6 | ∞      | D6= | 0.050 |     |        |     |       |

TABLE 4

| | Cone coefficiente | Aspheric coefficient | | | | | | |
|---|---|---|---|---|---|---|---|---|
| | k | A4 | A6 | A8 | A10 | A12 | A14 | A16 |
| R1 | 4.2459E+01 | −9.3130E+00 | 4.3745E+02 | −1.0496E+04 | 1.3676E+05 | −9.9782E+05 | 3.8636E+06 | −6.1370E+06 |
| R2 | 1.0429E+00 | 4.2687E+00 | −1.8180E+02 | 4.3171E+03 | −5.4706E+04 | 3.7791E+05 | −1.3328E+06 | 1.8777E+06 |

The Embodiment 2 meets the conditions (1)-(6), as shown in Table 7.

Figure 7:
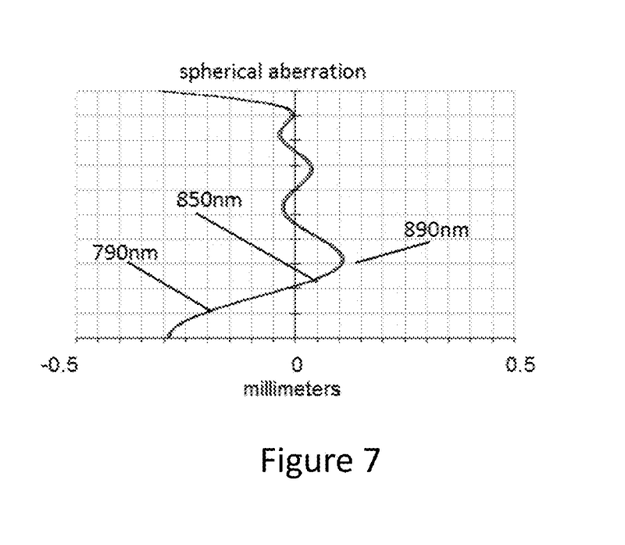
FIG. 7 is the spherical aberration diagram of the camera lens LA in Embodiment 2.
Figure 8:
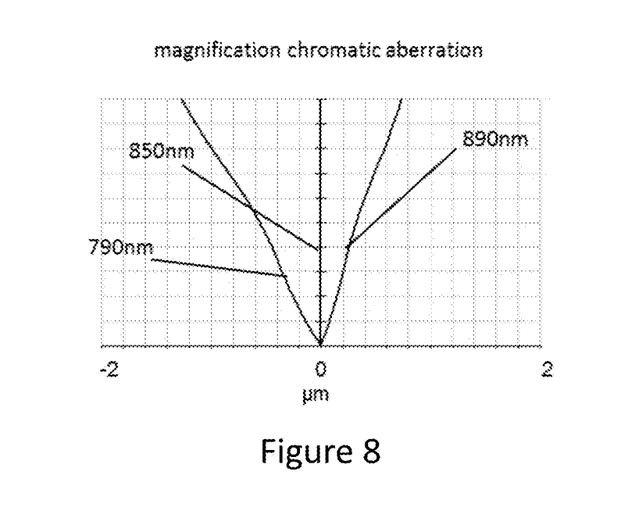
FIG. 8 is the magnification chromatic aberration diagram of the camera lens LA in Embodiment 2.
Figure 9:
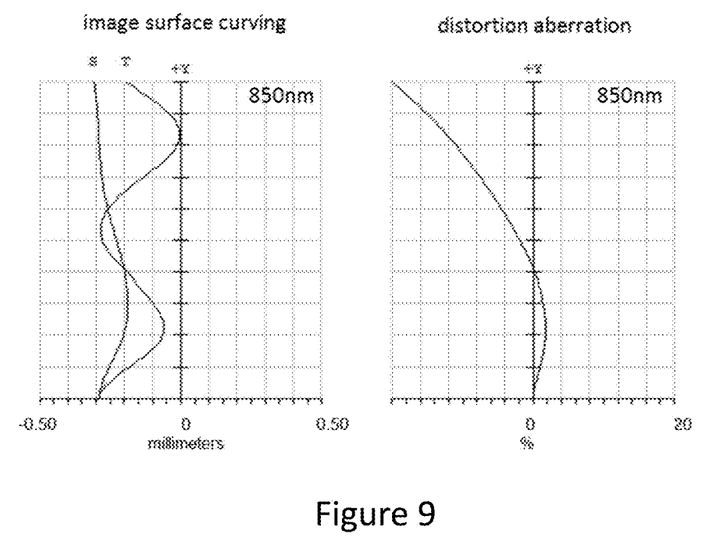
FIG. 9 is the image surface curving diagram and distortion aberration diagram of the camera lens LA in Embodiment 2.

Spherical aberration of camera lens LA in embodiment 2 is shown in FIG. 7, magnification chromatic aberration of the same is shown in FIG. 8, image surface curving and distortion aberration of the same is shown in FIG. 9. The camera lens LA in embodiment 2 has properties as Fno=2.20, 2ω=93.8°, TL=2.847 mm, so camera lens is small sized and wide angle camera lens, it is not difficult to understand why it has excellent optical properties.

Embodiment 3

Figure 10:
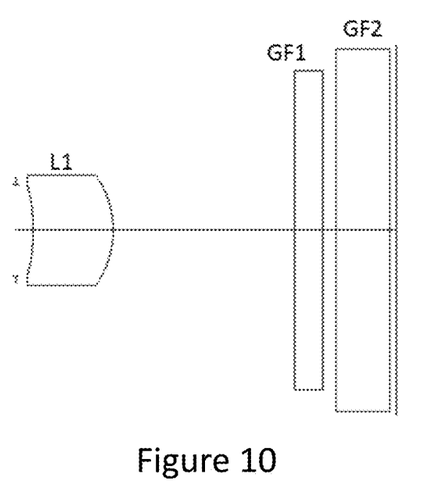
FIG. 10 is the structure diagram of the definite Embodiment 3 of the above-mentioned camera lens LA.

The configuration structure diagram of the camera lens LA in the Embodiment 3 is shown in the FIG. 10. Data shown in Table 5: curvature radius R of the object side surface and the image side surface, center thickness of the lens, distance d among the lenses, refractive power nd and abbe number v of the first lens L1 in the Embodiment 3, wherein the camera lens LA is formed by the first lens L1; Data shown in Table 6: and the data including conical coefficients k and aspheric coefficients

TABLE 5

| R | | D | | nd | | v d | |
|---|---|---|---|---|---|---|---|
| S1 | ∞ | D0= | 0.127 | | | | |
| R1 | −2.579 | D1= | 0.599 | nd1 | 1.5831 | v 1 | 56.12 |
| R2 | −1.692 | D2= | 1.355 | | | | |
| R3 | ∞ | D3= | 0.210 | nd2 | 1.5168 | v 2 | 64.20 |
| R4 | ∞ | D4= | 0.100 | | | | |
| R5 | ∞ | D5= | 0.400 | nd3 | 1.5168 | v 3 | 64.20 |
| R6 | ∞ | D6= | 0.050 | | | | |

TABLE 6

| | Cone coefficiente | Aspheric coefficient | | | | | | |
|---|---|---|---|---|---|---|---|---|
| | k | A4 | A6 | A8 | A10 | A12 | A14 | A16 |
| R1 | 4.6152E+01 | −9.6157E+00 | 4.4352E+02 | −1.0525E+04 | 1.3666E+05 | −9.9840E+05 | 3.8672E+06 | −6.0787E+06 |
| R2 | 7.4868E−01 | 4.2786E+00 | −1.8380E+02 | 4.3202E+03 | −5.4650E+04 | 3.7753E+05 | −1.3338E+06 | 1.8836E+06 |

The Embodiment 3 meets the conditions (1)-(6), as shown in Table 7.

Figure 11:
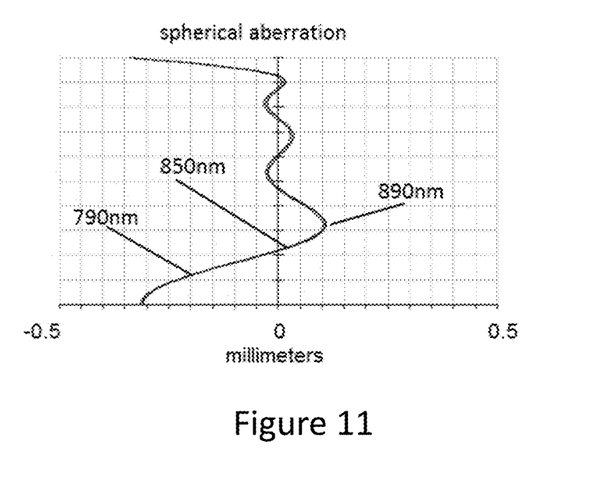
FIG. 11 is the spherical aberration diagram of the camera lens LA in Embodiment 3.
Figure 12:
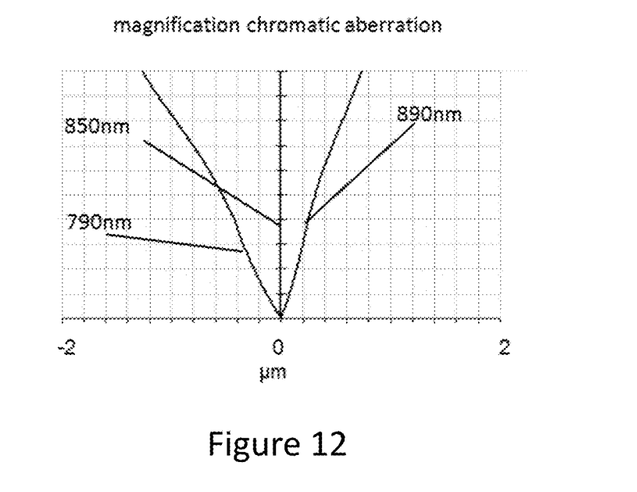
FIG. 12 is the magnification chromatic aberration diagram of the camera lens LA in Embodiment 3.
Figure 13:
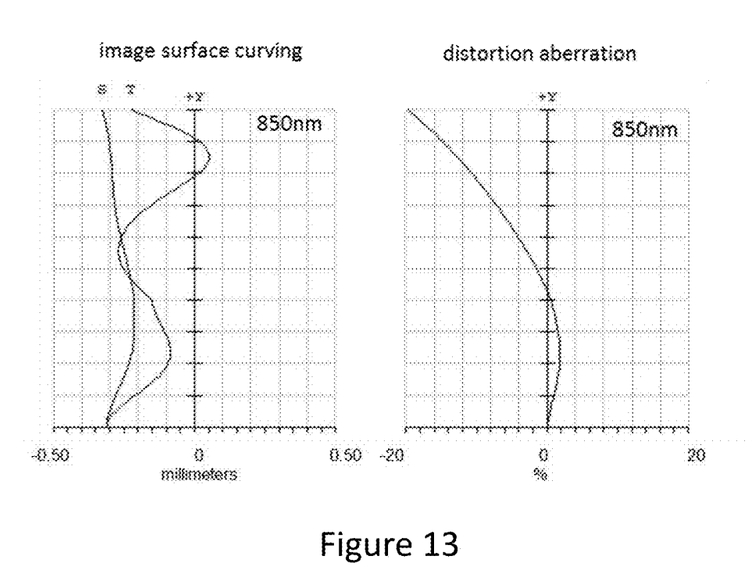
FIG. 13 is the image surface curving diagram and distortion aberration diagram of the camera lens LA in Embodiment 3.

Spherical aberration of camera lens LA in embodiment 3 is shown in FIG. 11, magnification chromatic aberration of the same is shown in FIG. 12, image surface curving and distortion aberration of the same is shown in FIG. 13. As show in FIGS. 7~9, the camera lens in embodiment 3 has the properties as follows: Fno=2.20, 2ω=92.9°, TL=2.841 mm, so camera lens is small sized and wide angle camera lens, it is not difficult to understand why it has excellent optical properties.

The values in all embodiments and the values corresponding to the parameters specified in the conditional formulas (1)-(6) are shown in the Table 7. Besides, the units shown in table 5 respectively are 2ω(°), f(mm), TL(mm), BF(mm), Y(mm).

TABLE 7

| | Embodiment 1 | Embodiment 2 | Embodiment 3 | Condition |
|---|---|---|---|---|
| (R1 + R2)/(R1 − R2) | 1.820 | 1.760 | 1.730 | 1 |
| D1/f | 0.347 | 0.404 | 0.407 | 2 |
| Y/f | 0.943 | 0.943 | 0.951 | 3 |
| (Y/f) × 2ω | 1.547 | 1.542 | 1.542 | 4 |
| f/TL | 0.558 | 0.521 | 0.518 | 5 |
| BF/f | 1.391 | 1.421 | 1.438 | 6 |
| nd1 | 1.580 | 1.580 | 1.580 | |
| Fno | 2.20 | 2.20 | 2.20 | |
| f | 1.484 | 1.485 | 1.471 | |
| 2ω | 94.0 | 93.8 | 92.9 | |
| TL | 2.659 | 2.847 | 2.841 | |
| BF | 2.064 | 2.110 | 2.115 | |
| Y | 1.400 | 1.400 | 1.400 | |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera lens comprising:
an open aperture;
a falcate first lens having a positive refractive power with a convex surface toward an imaging surface side;
wherein
the camera lens satisfies the following conditions (1)~(4):

$$1.70 \leq (R1+R2)/(R1-R2) \leq 1.90 \quad (1)$$

$$0.30 \leq D1/f \leq 0.45 \quad (2)$$

$$0.90 \leq Y/f \leq 1.00 \quad (3)$$

$$1.50 \leq (Y/f) \times 2\omega \leq 1.70 \quad (4)$$

where,
R1: curvature radius of the first lens' object side surface;
R2: curvature radius of the first lens' image side surface;
d1: center thickness of the first lens L1;
f: overall focal distance of the camera lens;
Y: Max image height;
2ω: total angle of view.

2. The camera lens as described in claim 1 further satisfying the following condition (5):

$$0.50 \leq f/TL \leq 0.60 \quad (5)$$

where,
f: overall focal distance of the camera lens;
TL: axial distance from object side surface to the imaging surface side of the first lens L1.

3. The camera lens as described in claim 1 further satisfying the following condition (6):

$$1.35 \leq BF/f \leq 1.45 \quad (6)$$

where,
f: overall focal distance of the camera lens;
BF: axial distance from image side surface to the imaging surface side of the first lens L1.

4. The camera lens as described in claim 1 further satisfying the following condition (7):

$$1.53 \leq nd1 \leq 1.60 \quad (7)$$

where,
nd1: refractive power the first lens L1's line d.

\* \* \* \* \*